United States Patent
Ahn et al.

(10) Patent No.: US 7,944,970 B2
(45) Date of Patent: May 17, 2011

(54) APPARATUS AND METHOD FOR DISPLAYING 3-DIMENSIONAL GRAPHICS

(75) Inventors: Jeonghwan Ahn, Suwon-si (KR); Dokyoon Kim, Seongnam-si (KR); Keechang Lee, Yongin-si (KR); Sangoak Woo, Anyang-si (KR); Nikolay Yurievich Gerasimov, Saint-Petersbug (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1336 days.

(21) Appl. No.: 11/451,473

(22) Filed: Jun. 13, 2006

(65) Prior Publication Data

US 2006/0284868 A1 Dec. 21, 2006

(30) Foreign Application Priority Data

Jun. 21, 2005 (KR) ........................ 10-2005-0053551

(51) Int. Cl.
- *H04N 7/12* (2006.01)
- *H04N 11/02* (2006.01)
- *H04N 11/04* (2006.01)
- *H04B 1/66* (2006.01)

(52) U.S. Cl. ................................. 375/240.09

(58) Field of Classification Search ............... None
See application file for complete search history.

(56) References Cited

U.S. PATENT DOCUMENTS

| | | | |
|---|---|---|---|
| 5,808,598 A | 9/1998 | Nakatani et al. | |
| 6,320,518 B2 * | 11/2001 | Saeki et al. | 340/995.12 |
| 6,452,544 B1 | 9/2002 | Hakala et al. | |
| 6,622,090 B2 * | 9/2003 | Lin | 701/213 |
| 2003/0069691 A1 | 4/2003 | Schroeder | |
| 2004/0243307 A1 * | 12/2004 | Geelen | 701/213 |

FOREIGN PATENT DOCUMENTS

| | | |
|---|---|---|
| EP | 0 772 174 A1 | 5/1997 |
| EP | 0 945 706 | 9/1999 |
| EP | 1 146 316 A2 | 10/2001 |
| EP | 1 435 508 A2 | 7/2004 |
| EP | 1 441 196 | 7/2004 |
| EP | 1 526 359 A1 | 4/2005 |
| JP | 2001-235335 | 8/2001 |

OTHER PUBLICATIONS

Extended European Search Report mailed Sep. 2, 2009, corresponding to European Patent Application No. 06252816.1-1236.
European Search Report issued on Dec. 16, 2010 corresponds to European Patent Application No. 06 252 816.1-1236.

* cited by examiner

*Primary Examiner* — Nhon T Diep
(74) *Attorney, Agent, or Firm* — Staas & Halsey LLP

(57) ABSTRACT

An apparatus and method for displaying topography around a position of a mobile object such as a vehicle in 3-dimensional graphics. The method includes predicting a candidate region for the mobile object's position at a display time after a predetermined period of time using current position and motion information of the mobile object; loading 3-dimensional graphic data corresponding to the predicted candidate region to memory; and rendering and displaying data corresponding to a region around a position of the mobile object at the display time among the 3-dimensional graphic data loaded to the memory.

35 Claims, 9 Drawing Sheets

APPARATUS AND METHOD FOR DISPLAYING 3-DIMENSIONAL GRAPHICS

CROSS-REFERENCE TO RELATED APPLICATION

This application claims the benefit of Korean Patent Application No. 10-2005-0053551, filed on Jun. 21, 2005, in the Korean Intellectual Property Office, the disclosure of which is incorporated herein by reference.

BACKGROUND OF THE INVENTION

1. Field of the Invention

The present invention relates to an apparatus and method for displaying 3-dimensional graphics, and more particularly, to an apparatus and method for displaying a region around a position of a mobile object such as a vehicle in 3-dimensional graphics in car navigation or 3-dimensional games.

2. Description of Related Art

Recently, the number of vehicles on the roads has increased, causing increased congestion of traffic. To avoid the congestion of traffic, car navigation systems have been developed. A car navigation system tracks a position of a moving vehicle and accurately displays a region around the vehicle on a road map. Additionally, car navigation systems provide information on a traffic state of other roads or information on, for example, gas stations.

To allow a driver to easily find a desired position on a map of the navigation system, visualization is important. In particular, 3-dimensional visualization is required because a driver can search a 3-dimensional map more conveniently and safely than search a 2-dimensional map while driving fast. Geographical features and buildings displayed in a 3-dimensional form can be instinctively recognized by viewers, thereby providing convenience and safety for drivers.

3-dimensional graphic data may be output in a Virtual Reality Modeling Language (VRML) format, a Moving Picture Experts Group (MPEG) format, or a file format defined by a normal commercial program in an apparatus that outputs 3-dimensional graphic data to a screen. The 3-dimensional graphic data includes geometrical information of objects, e.g., positions of 3-dimensional points of an object and connection of the points; material information of the objects, e.g., texture, transparency, and color of an object, light reflectivity of the object surface, a position and properties of a light source; and information on changes therein over time.

In a conventional method of receiving and displaying 3-dimensional graphic data on a screen, the 3-dimensional graphic data is loaded to memory and data corresponding to a region to be displayed on the screen among the loaded 3-dimensional graphic data is rendered and displayed.

In a first approach of displaying 3-dimensional graphics of a surrounding region changing continuously while a mobile object is moving, after 3-dimensional graphic data of an entire area is loaded to memory, a position of the mobile object is received at each display and only data on a region around the received position among the loaded data is rendered and displayed. However, since the entire 3-dimensional graphic data is very big, a large capacity of memory is needed for a display apparatus. As a result, the first approach has a drawback of increasing manufacturing cost and the size of a system.

In a second approach of displaying 3-dimensional graphics of a surrounding region changing continuously while a mobile object is moving, a position of the mobile object is received at each display, data on a region around the position is loaded to memory, and then the data loaded to the memory is rendered and displayed. However, time is needed to load 3-dimensional graphic data to the memory, and therefore, it is difficult to seamlessly display the 3-dimensional graphics in real time.

BRIEF SUMMARY

An aspect of the present invention provides an apparatus and method for displaying 3-dimensional graphics of a surrounding region changing according to the moving of a mobile object, by which a region where the mobile object may be positioned at a display time is predicted and 3-dimensional graphic data of only the predicted region is loaded to memory, so that 3-dimensional graphics are seamlessly displayed with a small capacity of memory.

According to an aspect of the present invention, there is provided a method of receiving 3-dimensional graphic data corresponding to an entire area and displaying a region around a mobile object in 3-dimensional graphics. The method includes: predicting a candidate region for the mobile object's position at a display time after a predetermined period of time using current position and motion information of the mobile object; loading 3-dimensional graphic data corresponding to the predicted candidate region to memory; and rendering and displaying data corresponding to a region around a position of the mobile object at the display time among the 3-dimensional graphic data loaded to the memory.

The candidate region may be predicted using a current position, a moving speed, and a moving direction of the mobile object.

The candidate region may be predicted using a current position of mobile object, a maximum right position at which the mobile object may be positioned at the display time, a maximum left position at which the mobile object may be positioned at the display time, and a size of a display region.

The predicting of the candidate region may include: dividing the 3-dimensional graphic data corresponding to the entire area into a plurality of blocks; predicting a region, in which the mobile object may be positioned at the display time, using the current position and motion information of the mobile object; and extracting blocks included in the predicted region from the plurality of blocks.

The extracting of the blocks may include extracting blocks whose bounding box meets a border of the predicted region from the plurality of blocks.

The extracting of the blocks may include extracting blocks whose central point is positioned within the predicted region from the plurality of blocks.

According to another aspect of the present invention, there is provided a method of receiving 3-dimensional graphic data corresponding to an entire area and displaying a region around a vehicle in 3-dimensional graphics. The method includes: predicting a candidate region for the vehicle's position at a display time after a predetermined period of time using current position and motion information of the vehicle; loading 3-dimensional graphic data corresponding to the predicted candidate region to memory; and rendering and displaying data corresponding to a region around a position of the vehicle at the display time among the 3-dimensional graphic data loaded to the memory.

The candidate region may be predicted using a current position, a moving speed, and a moving direction of the vehicle.

The candidate region may be predicted using a maximum right position at which the vehicle may be positioned at the display time, a maximum left position at which the vehicle may be positioned at the display time, a position of the vehicle at the display time when the vehicle moves in a current state, and a size of a display region.

The maximum right position may be calculated using a maximum right angular velocity of a steering wheel of the vehicle and the maximum left position may be calculated using a maximum left angular velocity of a steering wheel of the vehicle.

When the vehicle moves in the current state, a current rotation angle of a steering wheel of the vehicle may be maintained while the vehicle is moving.

The predicting of the candidate region may include: dividing the 3-dimensional graphic data corresponding to the entire area into a plurality of blocks; predicting a region, in which the vehicle may be positioned at the display time, using the current position and motion information of the vehicle; and extracting blocks included in the predicted region from the plurality of blocks.

The extracting of the blocks may include extracting blocks whose bounding box meets a border of the predicted region from the plurality of blocks or extracting blocks whose central point is positioned within the predicted region from the plurality of blocks.

According to still another aspect of the present invention, there is provided an apparatus for receiving 3-dimensional graphic data corresponding to an entire area and displaying a region around a mobile object in 3-dimensional graphics. The apparatus includes: a memory unit storing 3-dimensional graphic data; a prediction unit predicting a candidate region for the mobile object's position at a display time after a predetermined period of time using current position and motion information of the mobile object; a loading unit loading 3-dimensional graphic data corresponding to the predicted candidate region to the memory unit; a rendering unit rendering data corresponding to a region around a position of the mobile object at the display time among the 3-dimensional graphic data loaded to the memory; and a display unit displaying the rendered data.

The candidate region may be predicted using a current position, a moving speed, and a moving direction of the mobile object.

The candidate region may be predicted using a current position of mobile object, a maximum right position at which the mobile object may be positioned at the display time, a maximum left position at which the mobile object may be positioned at the display time, and a size of a display region.

The prediction unit may include: a block dividing unit dividing the 3-dimensional graphic data corresponding to the entire area into a plurality of blocks; a region prediction unit predicting a region, in which the mobile object may be positioned at the display time, using the current position and motion information of the mobile object; and a block extraction unit extracting blocks included in the predicted region from the plurality of blocks.

The block extraction unit may extract blocks whose bounding box meets a border of the predicted region from the plurality of blocks as the candidate region or extract blocks whose central point is positioned within the predicted region from the plurality of blocks as the candidate region.

According to yet another aspect of the present invention, there is provided an apparatus for receiving 3-dimensional graphic data corresponding to an entire area and displaying a region around a vehicle in 3-dimensional graphics. The apparatus includes: a memory unit storing 3-dimensional graphic data; a prediction unit predicting a candidate region for the vehicle's position at a display time after a predetermined period of time using current position and motion information of the vehicle; a loading unit loading 3-dimensional graphic data corresponding to the predicted candidate region to the memory unit; a rendering unit rendering data corresponding to a region around a position of the vehicle at the display time among the 3-dimensional graphic data loaded to the memory; and a display unit displaying the rendered data.

The candidate region may be predicted using a current position, a moving speed, and a moving direction of the vehicle.

The candidate region may be predicted using a maximum right position at which the vehicle may be positioned at the display time, a maximum left position at which the vehicle may be positioned at the display time, a position of the vehicle at the display time when the vehicle moves in a current state, and a size of a display region.

The maximum right position may be calculated using a maximum right angular velocity of a steering wheel of the vehicle and the maximum left position may be calculated using a maximum left angular velocity of a steering wheel of the vehicle.

When the vehicle moves in the current state, a current rotation angle of a steering wheel of the vehicle may be maintained while the vehicle is moving.

The prediction unit may include: a block dividing unit dividing the 3-dimensional graphic data corresponding to the entire area into a plurality of blocks; a region prediction unit predicting a region, in which the vehicle may be positioned at the display time, using the current position and motion information of the vehicle; and a block extraction unit extracting blocks included in the predicted region from the plurality of blocks.

The block extraction unit may extract blocks whose bounding box meets a border of the predicted region from the plurality of blocks as the candidate region or extract blocks whose central point is positioned within the predicted region from the plurality of blocks as the candidate region.

According to still other aspects of the present invention, there are provided computer-readable storage media encoded with processing instructions for causing a processor to execute the aforementioned methods.

According to another aspect of the present invention, there is provided an apparatus for displaying 3-dimensional graphic data of a region around a mobile object, the apparatus including: a prediction unit predicting a candidate region for a position of the mobile object at a display time after a predetermined period of time using current position and motion information of the mobile object; an identifying unit identifying 3-dimensional graphic data corresponding to a predicted candidate region from 3-dimensinal graphic data of an area including the candidate region; a rendering unit rendering data corresponding to a region around the position of the mobile object at the display time among the identified 3-dimensional graphic data; and a display unit displaying the rendered data Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENT

Figure 1:
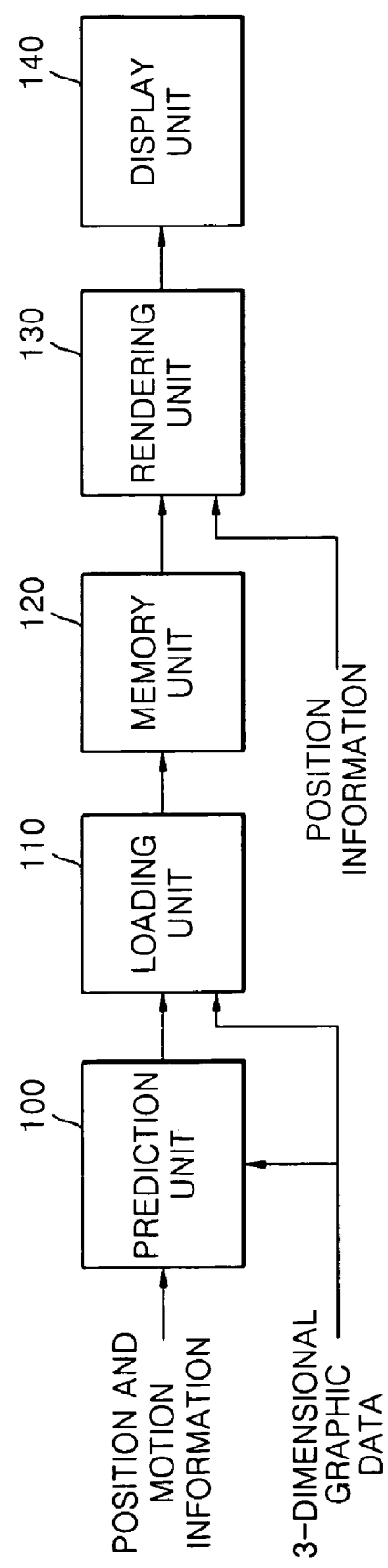
FIG. 1 is a block diagram of an apparatus for displaying 3-dimensional graphics according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for displaying 3-dimensional graphics according to an embodiment of the present invention. The apparatus includes a prediction unit 100, a loading unit 110, a memory unit 120, a rendering unit 130, and a display unit 140. The operations of the apparatus illustrated in FIG. 1 will be described with reference to FIG. 2, which is a flowchart of a method of displaying 3-dimensional graphics according to an embodiment of the present invention.

In operation 200, the prediction unit 100 predicts a candidate region in which a mobile object may be positioned at a following display time using a current position of the mobile object and motion information, such as the mobile object's speed and moving direction and an angle at which the mobile object can change a moving direction to the left or right in a current state.

In operation 210, the loading unit 110 loads to the memory unit 120 only data corresponding to the predicted candidate region among 3-dimensional graphic data of an entire area.

In operation 220, the rendering unit 130 receives a current position of the mobile object at the display time and renders data corresponding to a region to be displayed around the received current position among the data loaded to the memory unit 120. The size and the shape of the region to be displayed around the position of the mobile object and its relationship with the position of the mobile object may be predetermined so that the region to be displayed is calculated using the position of the mobile object.

In operation 230, the display unit 140 receives rendered 3-dimensional graphic data from the rendering unit 130 and displays it on a screen.

Figure 2:
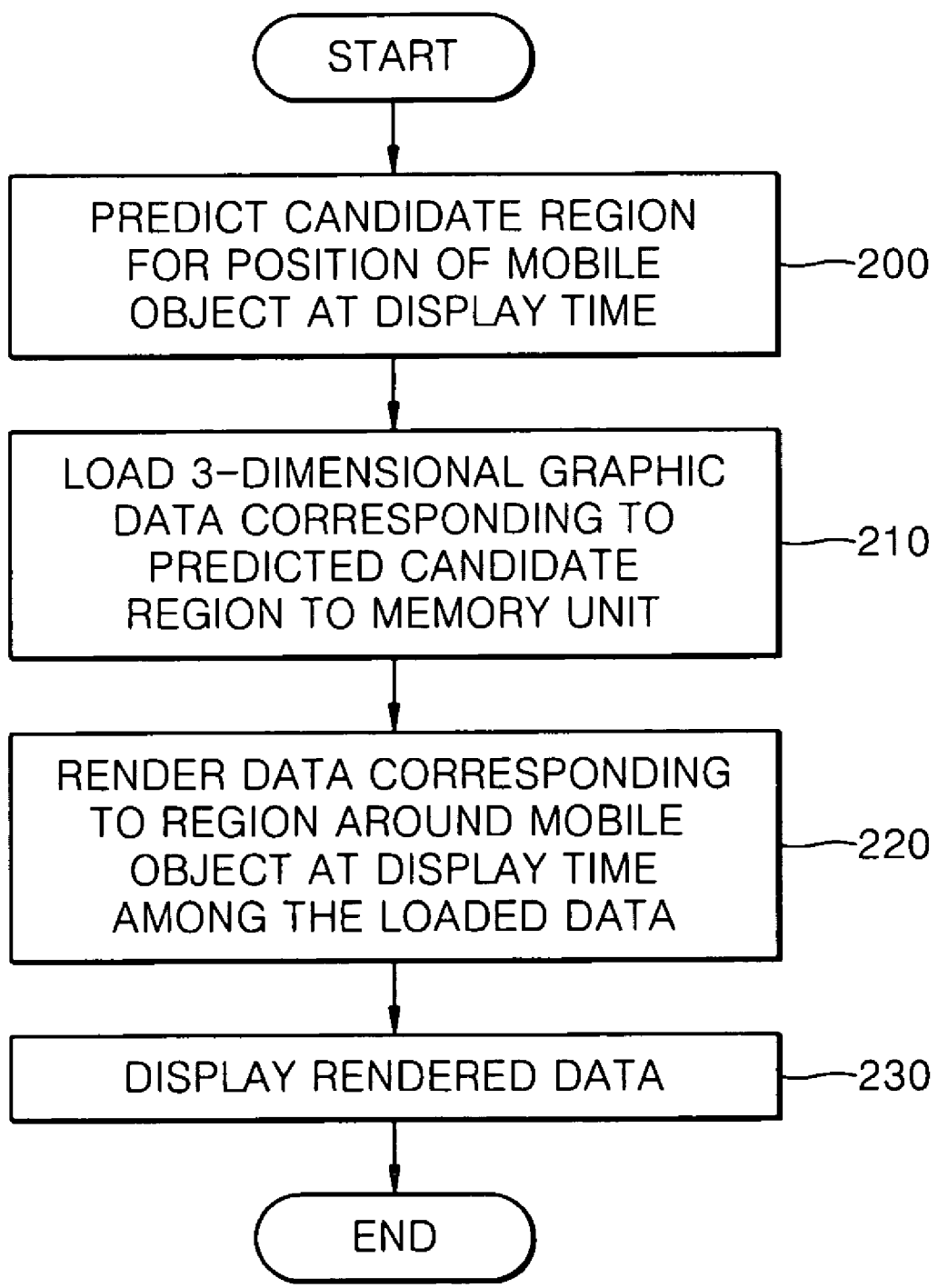
FIG. 2 is a flowchart of a method of displaying 3-dimensional graphics according to an embodiment of the present invention.
Figure 3:
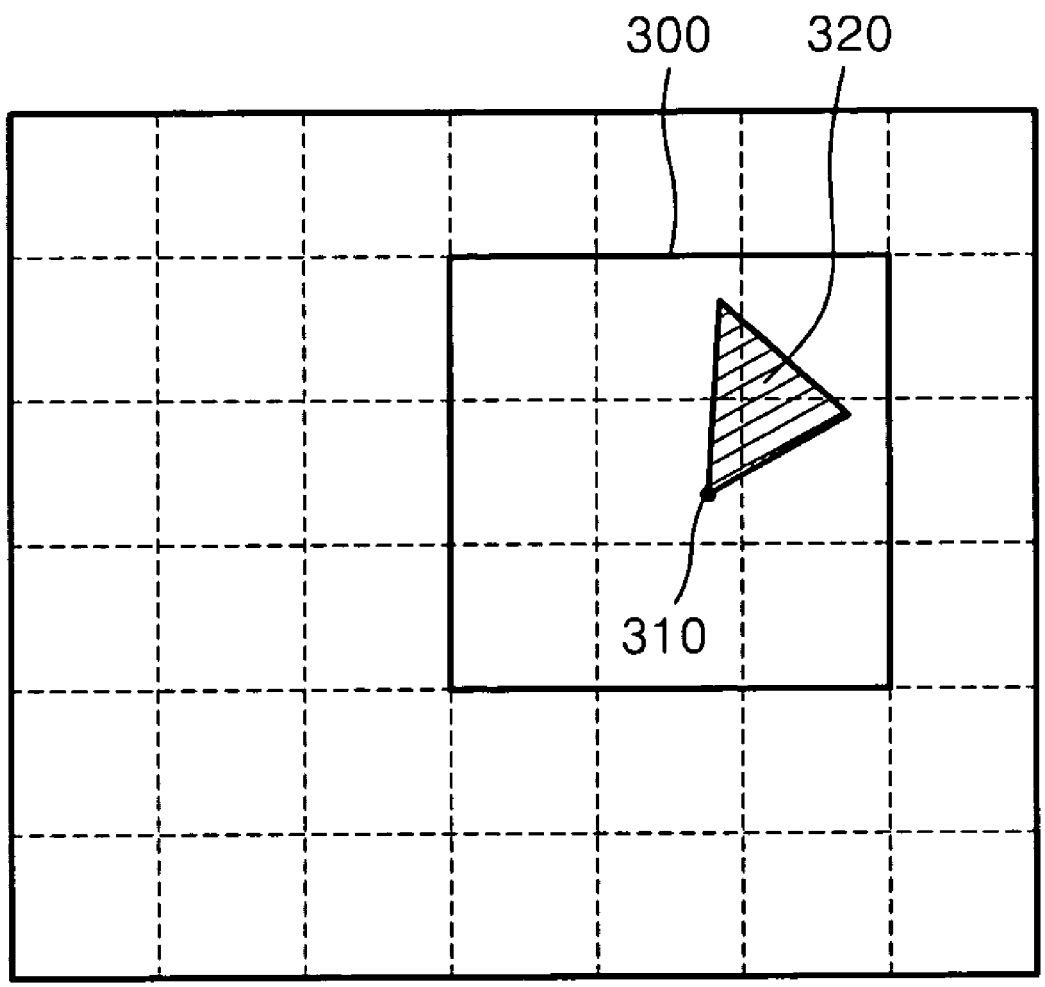
FIG. 3 illustrates a method of rendering data corresponding to a candidate region for a mobile object's position after the data is loaded to memory, according to an embodiment of the present invention.

FIG. 3 illustrates a method of rendering data corresponding to a candidate region for the mobile object's position after the data is loaded to the memory unit 120. Referring to FIGS. 1-3, the prediction unit 100 predicts a region 300 in an entire area as a candidate region for the mobile object's position at a display time and the loading unit 110 loads 3-dimensional graphic data corresponding to the region 300 to the memory unit 120. The rendering unit 130 receives a position 310 of the mobile object when the display time is encountered and renders data corresponding to a display region 320 to be displayed according to the received position 310. The display region 320 having a triangular shape is an example of a to-be-displayed region and has one vertex at a position of the mobile object and two vertexes in moving directions of the mobile object.

Hereinafter, a method of displaying 3-dimensional graphics according to another embodiment of the present invention will be described in detail with reference to FIGS. 4 through 9.

Figure 4:
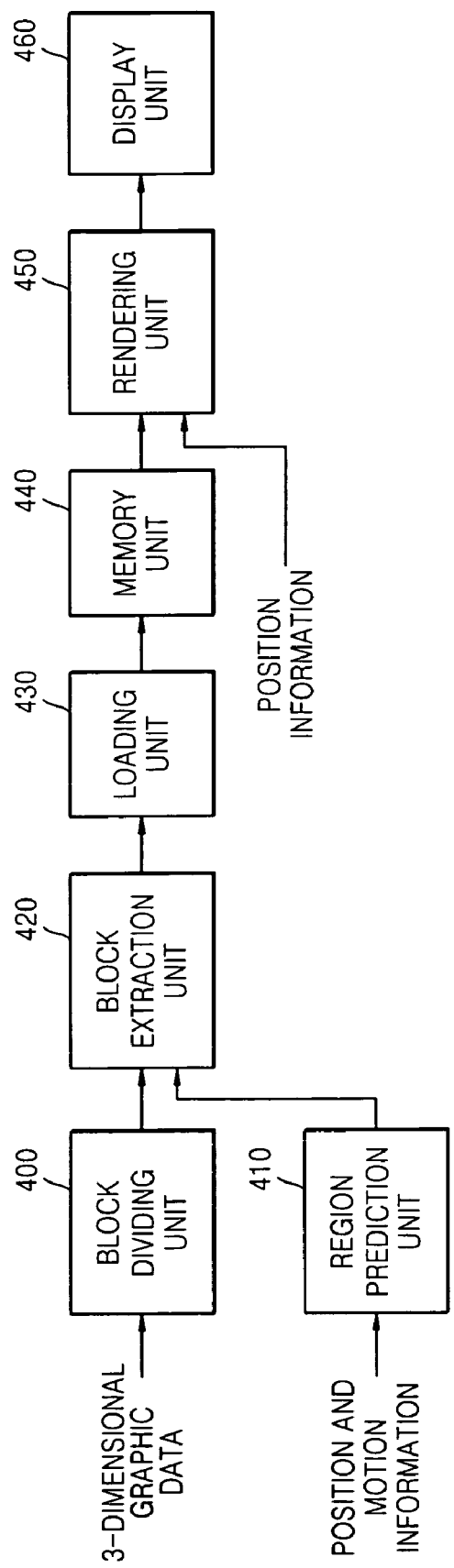
FIG. 4 is a block diagram of an apparatus for displaying 3-dimensional graphics according to another embodiment of the present invention.

FIG. 4 is a block diagram of an apparatus for displaying 3-dimensional graphics according to another embodiment of the present invention. The apparatus includes a block dividing unit 400, a region prediction unit 410, a block extraction unit 420, a loading unit 430, a memory unit 440, a rendering unit 450, and a display unit 460. The operations of the apparatus illustrated in FIG. 4 will be described with reference to FIG. 8, which is a flowchart of a method of displaying 3-dimensional graphics according to another embodiment of the present invention.

In operation 800, the block dividing unit 400 divides 3-dimensional graphic data of an entire area into a plurality of blocks. The block dividing unit 400 may divide the 3-dimensional graphic data based on a mesh so that each of the blocks includes at least one of the meshes.

In operation 810, the region prediction unit 410 predicts a candidate region in which a mobile object may be positioned at a display time, that is "t" seconds after a current time, using a current position of the mobile object and motion information, such as the mobile object's speed and moving direction and an angle at which the mobile object can change a moving direction to the left or right in a current state.

Figure 5:
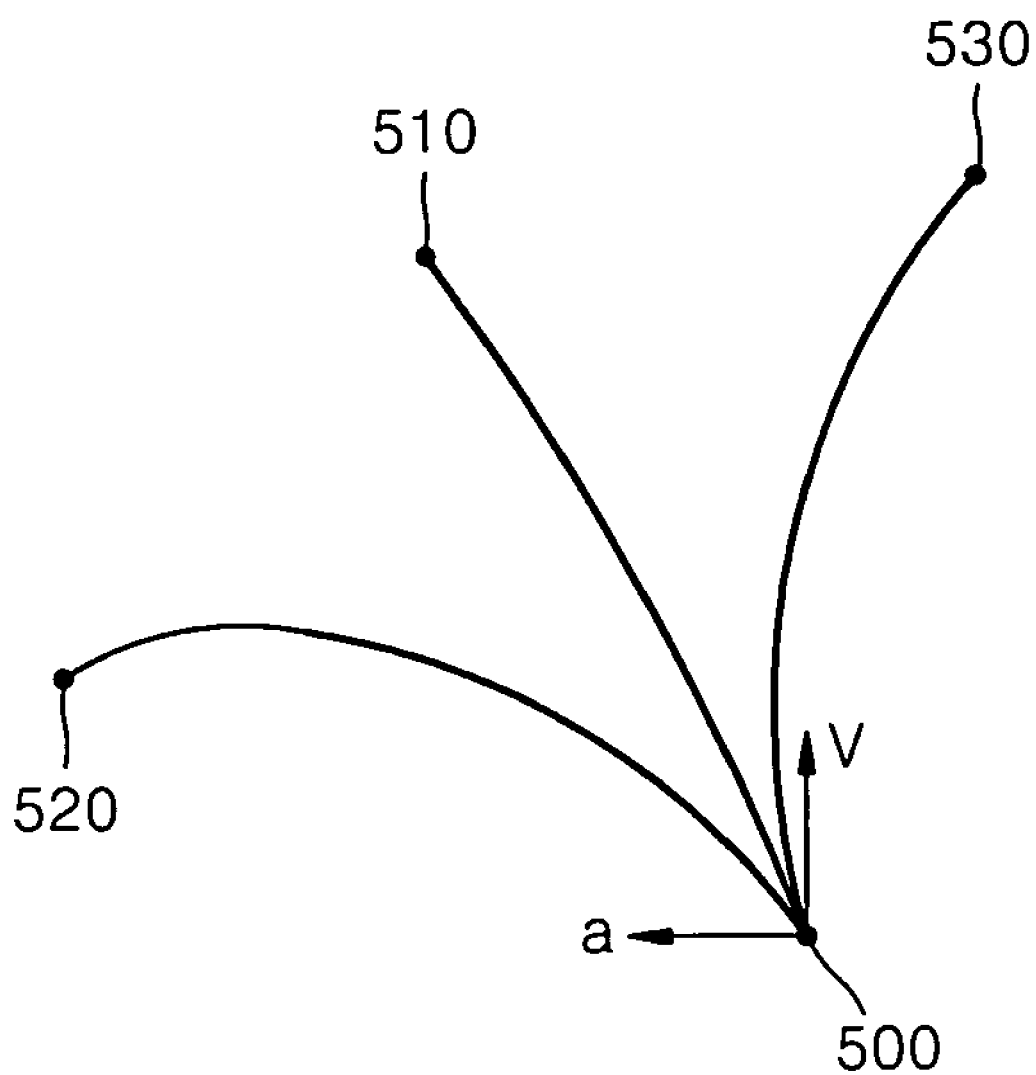
FIG. 5 illustrates a method of predicting a moving path of a vehicle.

FIG. 5 illustrates a method of predicting a path of a moving vehicle whose steering wheel is turned to the left from a current position 500 at a speed of "v", according to an embodiment of the present invention. Since the steering wheel of the moving vehicle has been turned to the left, the vehicle moves in a path curving to the left due to centripetal force "a" perpendicular to the direction of the moving speed "v". Accordingly, when the steering wheel is maintained at a current rotation angle, the moving vehicle is positioned at a point 510 after "t" seconds. When the steering wheel is further turned to the left from the current rotation angle, the moving vehicle curves to the left more abruptly. When the steering wheel is turned to the right, the moving vehicle curves to the right side of a moving path to the point 510.

A moving path to a point 520 is a path in which the vehicle can move maximally to the left in a current state and the point 520 is a maximum left point at which the vehicle may be positioned after "t" seconds. The moving path to the point 520 can be calculated using a maximum left angular velocity of the steering wheel.

A moving path to a point 530 is a path in which the vehicle can move maximally to the right in the current state and the point 530 is a maximum right point at which the vehicle may be positioned after "t" seconds. The moving path to the point 530 can be calculated using a maximum right angular velocity of the steering wheel.

As illustrated in FIG. 5, when a maximum left position, a maximum right position, and a current state position (at which the vehicle is positioned when the vehicle moves in a current state), at which the vehicle may be positioned after "t" seconds, are calculated, it is predicted that the vehicle is positioned between the moving path to the point 520 and the moving path to the point 530.

The following describes a method of calculating a position at which the vehicle will be positioned after "t" seconds. Assuming that a current position of the vehicle is the origin (0,0) and a y-axis corresponds to a direction of a current moving speed of the vehicle, a position at which the vehicle moving with the centripetal force is positioned after "t" seconds is calculated using Equation (1):

$$x(t)=R(\cos(\omega t)-1)$$

$$y(t)=R\sin(\omega t) \quad (1),$$

where R is a turning radius of the vehicle and ω is a rotation angular velocity of the vehicle. The turning radius R, the rotation angular velocity ω, and the moving speed "v" of the vehicle have a relationship of v=ωR. Accordingly, Equation (1) can be rewritten as Equation (2):

$$x(t) = \frac{v}{\omega}(\cos(\omega t) - 1)$$

$$y(t) = \frac{v}{\omega}\sin(\omega t). \quad (2)$$

The rotation angular velocity ω of the vehicle changes according to an angle at which a driver rotates the steering wheel of the vehicle and has a predetermined range. Accordingly, if the range of a value of x(t) in Equation (2) is calculated when the rotation angular velocity ω ranges from –B to B, the maximum right position and the maximum left position of the vehicle "t" seconds after can be obtained.

Figure 6A:
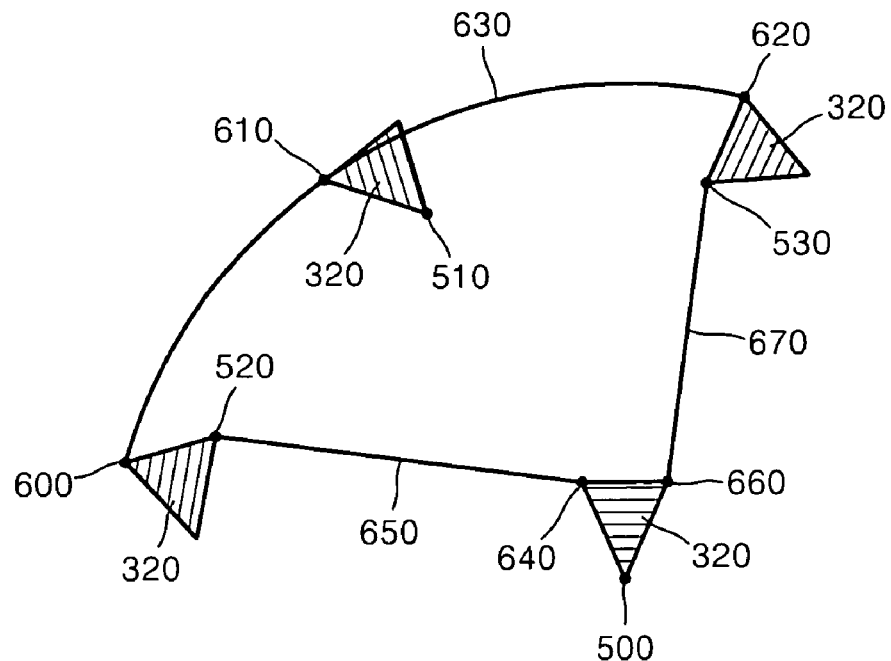
FIGS. 6A and 6B illustrate a method of determining a candidate region for a vehicle's position according to a predicted moving path of the vehicle, according to an embodiment of the present invention.
Figure 6B:
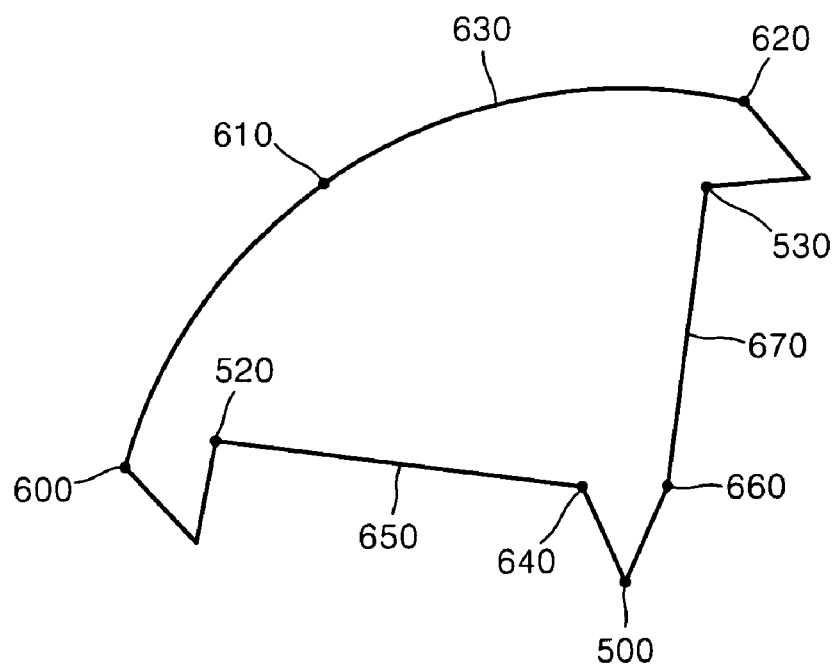

FIGS. 6A and 6B illustrate a method of determining a candidate region for a vehicle's position according to a predicted moving path of the vehicle. With respect to the current position 500, the position 510 at which the vehicle is positioned after "t" seconds when it moves in the current state, the maximum left position 520 "t" seconds after, and the maximum right position 530 "t" seconds after, the display region 320 described with reference to FIG. 3 is formed in a direction in which the vehicle moves at each of the positions 500, 510, 520, and 530. A circular arc 630 connecting three vertexes 600, 610, ad 620 of the three display regions 320 respectively formed at the points 510, 520, and 530 is formed. A straight line 650 connecting a left vertex 640 of the display region 320 formed at the current position 500 of the vehicle and the maximum left position 520 "t" seconds after is formed. A straight line 670 connecting a right vertex 660 of the display region 320 formed at the current position 500 of the vehicle and the maximum right position 530 "t" seconds after is formed. As illustrated in FIG. 6B, it is advantageous to predict a region surrounded by the display regions 320, the circular arc 630, and the two straight lines 650 and 670 as a candidate region for the vehicle's position "t" seconds after.

Figure 9:
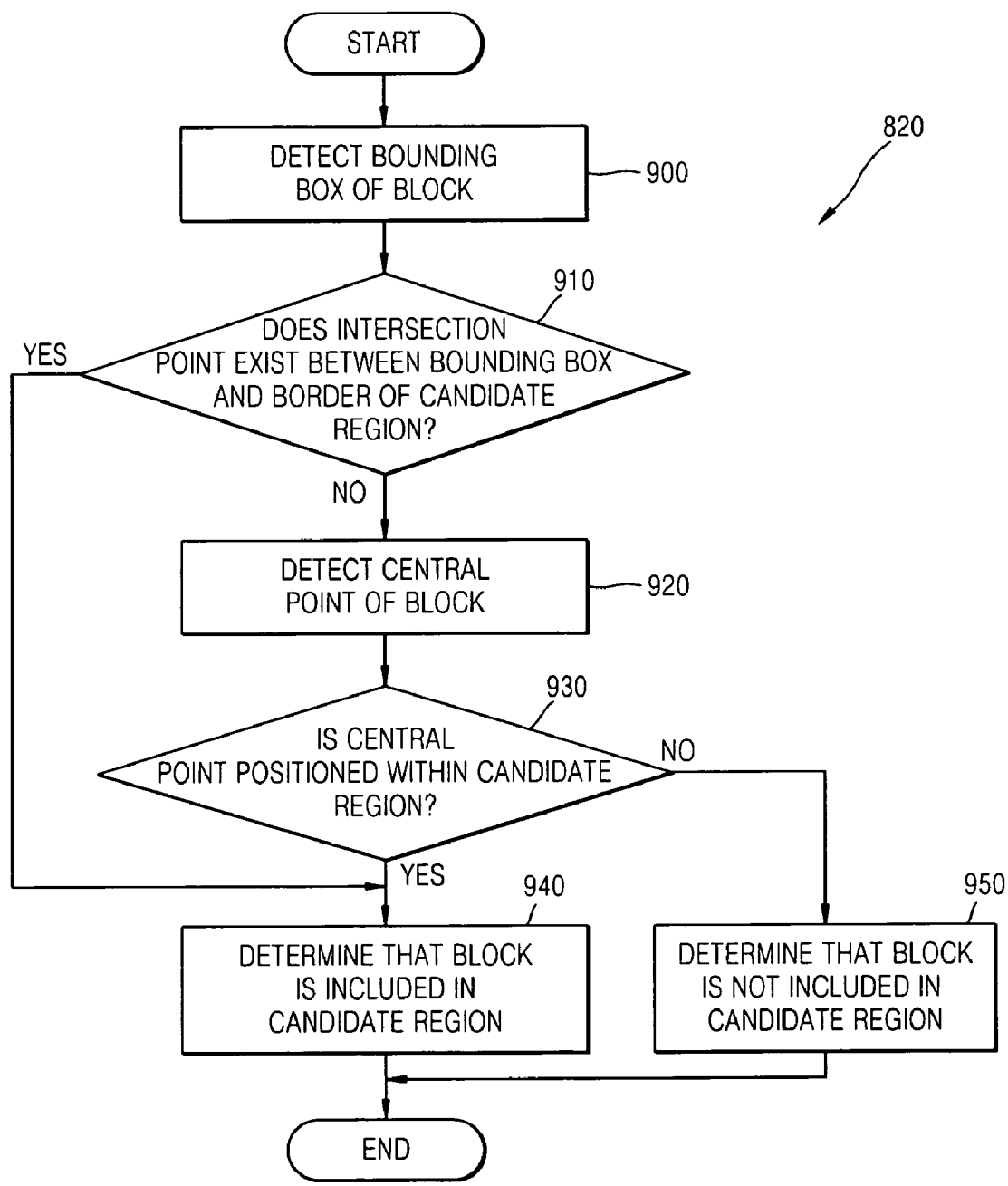
FIG. 9 is a detailed flowchart of an operation of extracting blocks included in a candidate region for a vehicle's position shown in FIG. 8.

In operation 820, the block extraction unit 420 extracts blocks included in the candidate region predicted by the region prediction unit 410 among blocks divided by the block dividing unit 400. FIG. 9 is a detailed flowchart of the operation 820 shown in FIG. 8. The operation 820 will be described with reference to FIGS. 7A and 7B.

In operation 90, the block extraction unit 420 detects a bounding box of a block. The bounding box may be a rectangular shape contacting an external angle of the block. In operation 910, the block extraction unit 420 determines whether there is an intersection point between the detected bounding box and the border of the candidate region for the vehicle's position. If it is determined that there is an intersection point therebetween, it is determined that the block is included in the candidate region in operation 940.

Figure 7A:
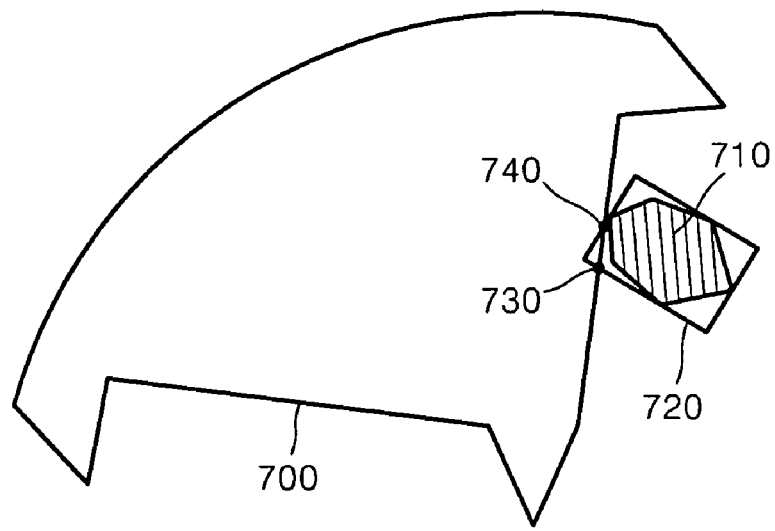
FIGS. 7A and 7B illustrate a method of extracting blocks included in a candidate region for a vehicle's position, according to an embodiment of the present invention.

Referring to FIG. 7A, when there are intersection points 730 and 740 between a bounding box 720 of a block 710 and a border 700 of a candidate region for a vehicle's position, the block 710 is determined as being included in the candidate region.

When there is no intersection point between the bounding box and the border of the candidate region, a central point of the block is detected in operation 920. In operation 930, it is determined whether the central point of the block is positioned within the candidate region. When it is determined that the central point of the block is positioned within the candidate region, it is determined that the block is included in the candidate region in operation 940. However, when it is determined that the central point of the block is not positioned within the candidate region, it is determined that the block is not included in the candidate region in operation 950.

Figure 7B:
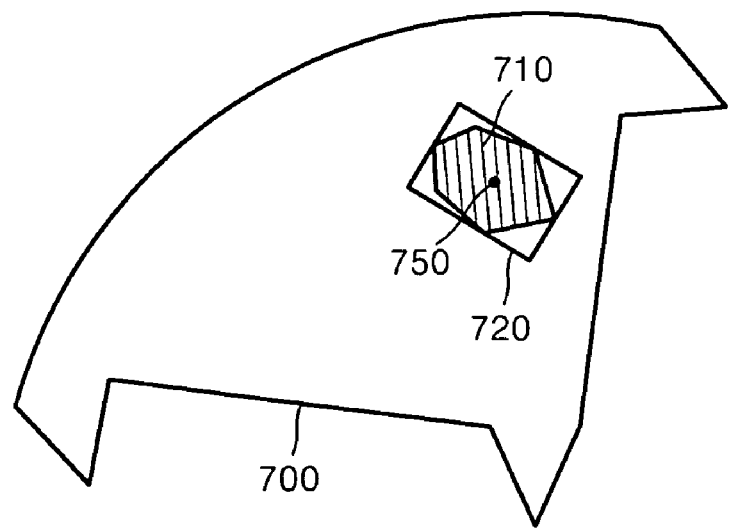
Figure 8:
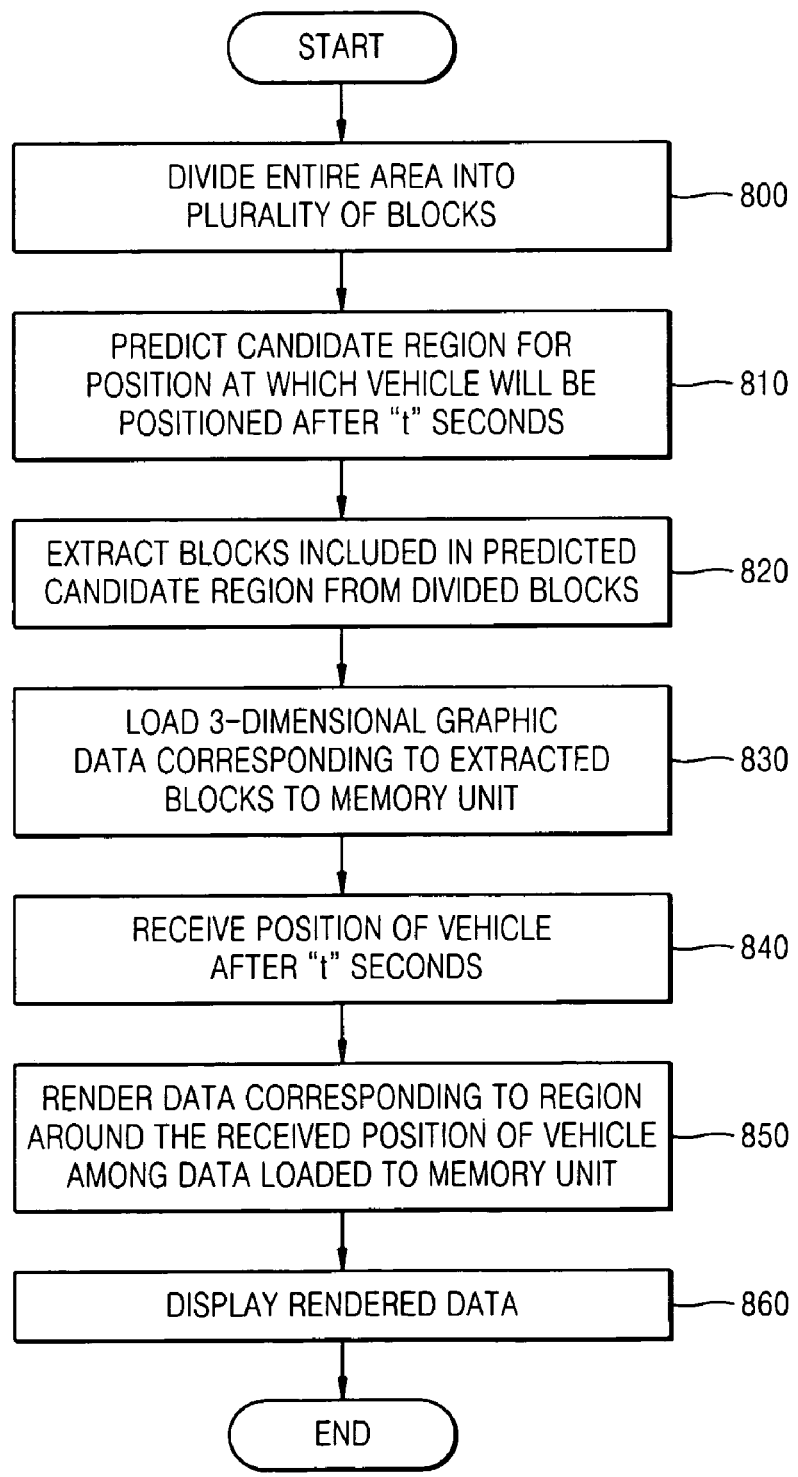
FIG. 8 is a flowchart of a method of displaying 3-dimensional graphics according to another embodiment of the present invention.

Referring to FIG. 7B, when a central point 750 of the block 710 is positioned inside the border 700 of the candidate region, it is determined that the block 710 is included in the candidate region.

In operation 830, the loading unit 430 receives blocks included in the candidate region from the block extraction unit 420 and loads 3-dimensional graphic data corresponding to the received blocks to the memory unit 440.

After "t" seconds, i.e., at a display time, the rendering unit 450 receives a current position of the vehicle in operation 840 and renders 3-dimensional graphic data corresponding to a display region around the current position among the 3-dimensional graphic data loaded to the memory unit 440 in operation 850.

In operation 860, the display unit 460 receives the rendered 3-dimensional graphic data from the rendering unit 450 and displays it on a screen.

According to the above-described embodiments of the present invention, a method and apparatus for displaying a changing region around a vehicle in 3-dimensional graphics according to a change in the position of the moving vehicle have been described. However, a method and apparatus for displaying 3-dimensional graphics according to the present invention can also be used to display a region around a mobile object, such as a character in 3-dimensional graphic games, which changes when the mobile object moves.

The above-described embodiments of the present invention can also be embodied as computer readable codes on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

According to the above-described embodiments of the present invention, when topography around a mobile object, which changes when the mobile object moves, is displayed in 3-dimensional graphics in car navigation or 3-dimensional games, a region in which the mobile object may be positioned at a next display time is predicted using a current position and motion information of the mobile object and then only 3-dimensional graphic data corresponding to the predicted region is loaded to memory and rendered. As a result, 3-dimensional graphics can be effectively and seamlessly displayed with a small capacity of memory.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of receiving 3-dimensional graphic data corresponding to an entire area and displaying a region around a mobile object in 3-dimensional graphics, the method comprising:
predicting a candidate region for a position of the mobile object at a display time after a predetermined period of time using current position and motion information of the mobile object;
loading 3-dimensional graphic data corresponding to a predicted candidate region into memory; and
rendering and displaying data corresponding to a region around the position of the mobile object at the display time among the 3-dimensional graphic data loaded into the memory.

2. The method of claim 1, wherein the candidate region is predicted using a current position, a moving speed, and a moving direction of the mobile object.

3. The method of claim 1, wherein the candidate region is predicted using a current position of the mobile object, a maximum right position at which the mobile object may be positioned at the display time, a maximum left position at which the mobile object may be positioned at the display time, and a size of a display region.

4. The method of claim 1, wherein the predicting a candidate region comprises:
dividing the 3-dimensional graphic data corresponding to the entire area into a plurality of blocks;
predicting a region, in which the mobile object may be positioned at the display time, using the current position and motion information of the mobile object; and
extracting blocks included in the predicted region from the plurality of blocks.

5. The method of claim 4, wherein the extracting blocks comprises extracting blocks whose bounding box meets a border of the predicted region from the plurality of blocks.

6. The method of claim 4, wherein the extracting blocks comprises extracting blocks whose central point is within the predicted region from the plurality of blocks.

7. A method of receiving 3-dimensional graphic data corresponding to an entire area and displaying a region around a vehicle in 3-dimensional graphics, the method comprising:
predicting a candidate region for a position of the vehicle at a display time after a predetermined period of time using current position and motion information of the vehicle;
loading 3-dimensional graphic data corresponding to a predicted candidate region into memory; and
rendering and displaying data corresponding to a region around the position of the vehicle at the display time among the 3-dimensional graphic data loaded into the memory.

8. The method of claim 7, wherein the candidate region is predicted using a current position, a moving speed, and a moving direction of the vehicle.

9. The method of claim 7, wherein the candidate region is predicted using a maximum right position at which the vehicle may be positioned at the display time, a maximum left position at which the vehicle may be positioned at the display time, a position of the vehicle at the display time when the vehicle moves in a current state, and a size of a display region.

10. The method of claim 9, wherein the maximum right position is calculated using a maximum right angular velocity of a steering wheel of the vehicle.

11. The method of claim 9, wherein the maximum left position is calculated using a maximum left angular velocity of a steering wheel of the vehicle.

12. The method of claim 9, wherein, when the vehicle moves in a current state, a current rotation angle of a steering wheel of the vehicle is maintained while the vehicle is moving.

13. The method of claim 7, wherein the predicting a candidate region comprises calculating a position, at which the vehicle will be positioned after "t" seconds, using:

$$x(t) = \frac{v}{\omega}(\cos(\omega t) - 1)$$
$$y(t) = \frac{v}{\omega}\sin(\omega t),$$

wherein "v" is a moving speed of the vehicle, y(t) is a moving distance of the vehicle in a direction of the moving speed, x(t) is a moving distance of the vehicle in a direction perpendicular to the direction of the moving speed, and $\omega$ is a rotation angular velocity of the vehicle.

14. The method of claim 7, wherein the predicting a candidate region comprises:
dividing the 3-dimensional graphic data corresponding to the entire area into a plurality of blocks;
predicting a region, in which the vehicle may be positioned at the display time, using the current position and motion information of the vehicle; and
extracting blocks included in the predicted region from the plurality of blocks.

15. The method of claim 14, wherein the extracting blocks comprises extracting blocks whose bounding box meets a border of the predicted region from the plurality of blocks.

16. The method of claim 14, wherein the extracting blocks comprises extracting blocks whose central point is within the predicted region from the plurality of blocks.

17. A non-transitory computer-readable storage medium encoded with processing instructions for executing the method of claim 1.

18. A non-transitory computer-readable storage medium encoded with processing instructions for executing the method of claim 7.

19. An apparatus to receive 3-dimensional graphic data corresponding to an entire area and display a region around a mobile object in 3-dimensional graphics, the apparatus comprising:
a memory unit to store 3-dimensional graphic data;
a prediction unit to predict a candidate region for a position of the mobile object at a display time after a predetermined period of time using current position and motion information of the mobile object;
a loading unit to load 3-dimensional graphic data corresponding to a predicted candidate region into the memory unit;

a rendering unit to render data corresponding to a region around the position of the mobile object at the display time among the 3-dimensional graphic data loaded into the memory; and a display unit to display the rendered data.

20. The apparatus of claim 19, wherein the candidate region is predicted using a current position, a moving speed, and a moving direction of the mobile object.

21. The apparatus of claim 19, wherein the candidate region is predicted using a current position of the mobile object, a maximum right position at which the mobile object may be positioned at the display time, a maximum left position at which the mobile object may be positioned at the display time, and a size of a display region.

22. The apparatus of claim 19, wherein the prediction unit comprises:

a block dividing unit to divide the 3-dimensional graphic data corresponding to the entire area into a plurality of blocks;

a region prediction unit to predict a region, in which the mobile object may be positioned at the display time, using the current position and motion information of the mobile object; and a block extraction unit to extract blocks included in the predicted region from the plurality of blocks.

23. The apparatus of claim 22, wherein the block extraction unit extracts blocks whose bounding box meets a border of the predicted region from the plurality of blocks as the candidate region.

24. The apparatus of claim 22, wherein the block extraction unit extracts blocks whose central point is within the predicted region from the plurality of blocks as the candidate region.

25. An apparatus to receive 3-dimensional graphic data corresponding to an entire area and display a region around a vehicle in 3-dimensional graphics, the apparatus comprising:

a memory unit to store 3-dimensional graphic data;

a prediction unit to predict a candidate region for a position of the vehicle at a display time after a predetermined period of time using current position and motion information of the vehicle;

a loading unit to load 3-dimensional graphic data corresponding to a predicted candidate region into the memory unit;

a rendering unit to render data corresponding to a region around the position of the vehicle at the display time among the 3-dimensional graphic data loaded into the memory; and a display unit to display the rendered data.

26. The apparatus of claim 25, wherein the candidate region is predicted using a current position, a moving speed, and a moving direction of the vehicle.

27. The apparatus of claim 25, wherein the candidate region is predicted using a maximum right position at which the vehicle may be positioned at the display time, a maximum left position at which the vehicle may be positioned at the display time, a position of the vehicle at the display time when the vehicle moves in a current state, and a size of a display region.

28. The apparatus of claim 27, wherein the maximum right position is calculated using a maximum right angular velocity of a steering wheel of the vehicle.

29. The apparatus of claim 27, wherein the maximum left position is calculated using a maximum left angular velocity of a steering wheel of the vehicle.

30. The apparatus of claim 27, wherein, when the vehicle moves in a current state, a current rotation angle of a steering wheel of the vehicle is maintained while the vehicle is moving.

31. The apparatus of claim 25, wherein the prediction unit calculates a position, at which the vehicle will be positioned after "t" seconds, using:

$$x(t) = \frac{v}{\omega}(\cos(\omega t) - 1)$$
$$y(t) = \frac{v}{\omega}\sin(\omega t),$$

wherein "v" is a moving speed of the vehicle, y(t) is a moving distance of the vehicle in a direction of the moving speed, x(t) is a moving distance of the vehicle in a direction perpendicular to the direction of the moving speed, and ω is a rotation angular velocity of the vehicle.

32. The apparatus of claim 25, wherein the prediction unit comprises:

a block dividing unit to divide the 3-dimensional graphic data corresponding to the entire area into a plurality of blocks;

a region prediction unit to predict a region, in which the vehicle may be positioned at the display time, using the current position and motion information of the vehicle; and a block extraction unit to extract blocks included in the predicted region from the plurality of blocks.

33. The apparatus of claim 32, wherein the block extraction unit extracts blocks whose bounding box meets a border of the predicted region from the plurality of blocks as the candidate region.

34. The apparatus of claim 32, wherein the block extraction unit extracts blocks whose central point is within the predicted region from the plurality of blocks as the candidate region.

35. An apparatus to display 3-dimensional graphic data of a region around a mobile object, the apparatus comprising:

a prediction unit to predict a candidate region for a position of the mobile object at a display time after a predetermined period of time using current position and motion information of the mobile object;

an identifying unit to identify 3-dimensional graphic data corresponding to a predicted candidate region from 3-dimensional graphic data of an area including the candidate region;

a rendering unit to render data corresponding to a region around the position of the mobile object at the display time among the identified 3-dimensional graphic data; and a display unit to display the rendered data.

* * * * *

UNITED STATES PATENT AND TRADEMARK OFFICE
CERTIFICATE OF CORRECTION

PATENT NO. : 7,944,970 B2
APPLICATION NO. : 11/451473
DATED : May 17, 2011
INVENTOR(S) : Jeonghwan Ahn et al.

It is certified that error appears in the above-identified patent and that said Letters Patent is hereby corrected as shown below:

Title Page, Col. 1 item 75 (Inventors), Line 5, Delete "Saint-Petersbug" and insert --Saint-Petersburg--, therefor.

Signed and Sealed this
Third Day of January, 2012

David J. Kappos
*Director of the United States Patent and Trademark Office*